(12) United States Patent
Saha et al.

(10) Patent No.: US 7,774,397 B2
(45) Date of Patent: Aug. 10, 2010

(54) FFT/IFFT PROCESSOR

(75) Inventors: Kaushik Saha, Delhi (IN); Srijib Narayan Maiti, West Bengal (IN); Marco Cornero, Como (IT)

(73) Assignee: STMicroelectronics (R&D) Ltd., Buckinghamshire (GB)

( * ) Notice: Subject to any disclaimer, the term of this patent is extended or adjusted under 35 U.S.C. 154(b) by 994 days.

(21) Appl. No.: 11/003,924

(22) Filed: Dec. 3, 2004

(65) Prior Publication Data

US 2005/0138098 A1    Jun. 23, 2005

(30) Foreign Application Priority Data

Dec. 5, 2003    (IN) .................... 1520/DEL/2003

(51) Int. Cl.
    *G06F 17/14*    (2006.01)
(52) U.S. Cl. ..................................... 708/404
(58) Field of Classification Search .................. 708/404
    See application file for complete search history.

(56) References Cited

U.S. PATENT DOCUMENTS

| | | | |
|---|---|---|---|
| 5,091,875 A * | 2/1992 | Wong et al. | 708/404 |
| 5,941,940 A * | 8/1999 | Prasad et al. | 708/523 |
| 6,718,356 B1 * | 4/2004 | Rosner et al. | 708/404 |
| 7,246,143 B2 * | 7/2007 | Hu et al. | 708/404 |
| 2002/0194236 A1 * | 12/2002 | Morris | 708/403 |

* cited by examiner

*Primary Examiner*—David H Malzahn
(74) *Attorney, Agent, or Firm*—Lisa K. Jorgenson; James H. Morris; Wolf, Greenfield & Sacks, P.C.

(57) ABSTRACT

An FFT/IFFT processor having computation logic capable of processing butterfly operations, and storage for storing the operands of butterfly operations, including a mechanism for storing the operands of multiple consecutive butterfly operations in contiguous storage locations and wherein the computation logic is capable of simultaneously accessing and processing said multiple butterfly operations.

10 Claims, 4 Drawing Sheets

FFT/IFFT PROCESSOR

BACKGROUND OF THE INVENTION

1. Field of the Invention

The present invention relates to the field of digital signal processing. More particularly the invention relates to an improved FFT/IFFT processor.

2. Background of the Invention

The class of Fourier transforms that refer to signals that are discrete and periodic in nature are known as Discrete Fourier Transforms (DFT). The discrete Fourier transform (DFT) plays a key role in digital signal processing in areas such as spectral analysis, frequency domain filtering and poly-phase transformations.

The DFT of a sequence of length N can be decomposed into successively smaller DFTs. The manner in which this principle is implemented falls into two classes. The first class is called a "decimation in time" approach and the second is called a "decimation in frequency" method. The first derives its name from the fact that in the process of arranging the computation into smaller transformations the sequence "x(n)" (the index 'n' is often associated with time) is decomposed into successively smaller subsequences. In the second general class the sequence of DFT coefficients "x(k)" is decomposed into smaller subsequences (k denoting frequency). The present concept of the invention applies to both "decimation in time" as well as "decimation in frequency".

Since the amount of storing and processing of data in numerical computation algorithms is proportional to the number of arithmetic operations, it is generally accepted that a meaningful measure of complexity, or of the time required to implement a computational algorithm, is the number of multiplications and additions required. The direct computation of the DFT requires "$4N^2$" real multiplications and "$N(4N-2)$" real additions. Since the number of computations and thus the computation time is approximately proportional to "$N^2$" it is evident that the number of arithmetic operations required to compute the DFT by the direct method becomes very large for large values of "N". For this reason, computational procedures that reduce the number of multiplications and additions are of considerable interest. The Fast Fourier Transform (FFT) is an efficient algorithm for computing the DFT.

The basic computational block is called a "butterfly" a name derived from the appearance of flow of the computations involved in it. FIG. 1 shows a typical radix-2 butterfly computation. 1.1 represents the 2 inputs (referred to as the "odd" and "even" inputs) of the butterfly and 1.2 refers to the 2 outputs. One of the inputs (in this case the odd input) is multiplied by a complex quantity called the twiddle factor ($W_N^k$). The general equations describing the relationship between inputs and outputs are as follows:

$$X[k]=x[n]+x[n+N/2]W_N^k$$

$$X[k+N/2]=x[n]-x[n+N/2]W_N^k$$

An FFT butterfly calculation is implemented by a z-point data operation wherein "z" is referred to as the "radix". An "N" point FFT employs "N/z" butterfly units per stage (block) for "$\log_z N$" stages. The result of one butterfly stage is applied as an input to one or more subsequent butterfly stages.

The conventional method of implementing an FFT or Inverse Fourier Transform (IFFT) uses a radix-2/radix-4/mixed-radix approach with either "decimation in time (DIT)" or a "decimation in frequency (DIF)" approach.

Computational complexity for an N-point FFT calculation using the radix-2 approach=$O(N/2 * \log_2 N)$ where "N" is the length of the transform. There are exactly "$N/2 * \log_2 N$" butterfly computations, each including 3 complex loads, 1 complex multiply, 2 complex adds and 2 complex stores. A full radix-4 implementation on the other hand requires several complex load/store operations.

With the advancement of VLSI technology, it has become possible to incorporate several execution units like ALUs (Arithmetic and Logic unit) and multipliers in the processor cores, thereby permitting computational throughput to be increased. All these advancements may be utilized to enhance the performance of FFT/IFFT in terms of total time required to complete a FFT/IFFT of a given size. If we look at the basic butterfly structure of FIG. 1, it is evident that the computations, i.e. the multiplications, additions/subtractions are dependent on the loading of inputs and loading of the twiddle factor in the sense that computations cannot start unless these operands are loaded from the memory. The computations can finish fast because of the availability of multiple execution units which may function in parallel but there are requirements for faster loading and storing of operands and results. In many processors, multiple load/store units achieve this. Another solution to this problem is loading/storing operands/results for multiple consecutive butterflies and using multiple execution units to compute multiple butterflies almost simultaneously. This approach requires only augmentation of the data bus width. This is much more economical in terms of silicon area and complexity as compared to multiple load/store units. The necessary requirement for this is that the inputs/outputs of the consecutive butterflies be stored in consecutive locations in the memory. If we see the butterfly structure from top to bottom of any stage (except the first stage) for FFT/IFFT, it is clear that the consecutive butterflies cannot be computed for operands in consecutive memory locations.

FIG. 2 shows a block diagram for simultaneous loading of two n-bit operands. In this mechanism it is required to have two separate load/store units in the central processing unit (CPU) each having n-bit wide data bus connected to the memory block separately. This mechanism for simultaneous loading of two n-bit operands requires multiple load store units and hence is an expensive mechanism.

U.S. Pat. No. 5,293,330 describes a pipelined processor for mixed size FFT. These and many more works have dealt with enhancement of the performance of FFT/IFFT. The performance can further be improved with the implementation of the present invention.

Our co-pending application U.S. patent application Ser. No. 10/781,336, filed on Feb. 17, 2004, describes an algorithm, which is suitable for use with the proposed architecture for loading/storing inputs/outputs of multiple consecutive butterflies with only one load/store instruction.

SUMMARY OF THE INVENTION

An object of the present invention is to overcome the bottleneck of memory load/store and provide a device and method for implementing FFT/IFFT with improved performance using less silicon area and hence cost.

To achieve this and other objects, the present invention provides an improved FFT/IFFT processor comprising:

computation means capable of processing butterfly operations;

storage means for storing the operands of butterfly operations;

a mechanism for storing the operands of multiple consecutive butterfly operations in contiguous storage locations and wherein the computation means is capable of simultaneously accessing and processing said multiple butterfly operations.

The mechanism can be an address generator that constructs the addresses of the operands of multiple consecutive butterfly operations by introducing a '0' and/or '1' at a predetermined bit location in the addresses of the operands of consecutive butterflies of the same stage.

The predetermined location for introducing a bit for constructing the addresses of the operands of multiple consecutive butterfly operation depends upon the number of the FFT/IFFT stage which is being computed.

The simultaneous accessing and processing of said multiple butterfly operations is achieved by providing augmentation of data buses and registers.

The twiddle factors of the butterfly are computed by initializing a counter and then incrementing it by a value corresponding to the number of contiguous butterflies which are to be computed simultaneously and appending the result with a specified number of "0"s.

The invention further provides an improved method for FFT/IFFT processing comprising:

providing computation means capable of processing butterfly operations;

storing the operands of multiple consecutive butterfly operations in contiguous storage locations, and;

simultaneously accessing and processing said multiple butterfly operations.

The operands of multiple consecutive butterfly operations are stored in contiguous memory locations by constructing the addresses of the operands of multiple consecutive butterfly operations by introducing a '0' and/or '1' at a predetermined bit location in the addresses of the operands of consecutive butterflies of the same stage.

The multiple consecutive butterfly operations are simultaneously processed by providing augmented data buses and registers in the computation unit.

BRIEF DESCRIPTION OF THE DRAWINGS

The present invention will now be explained with reference to the accompanying drawings.

DETAILED DESCRIPTION

Figure 1:
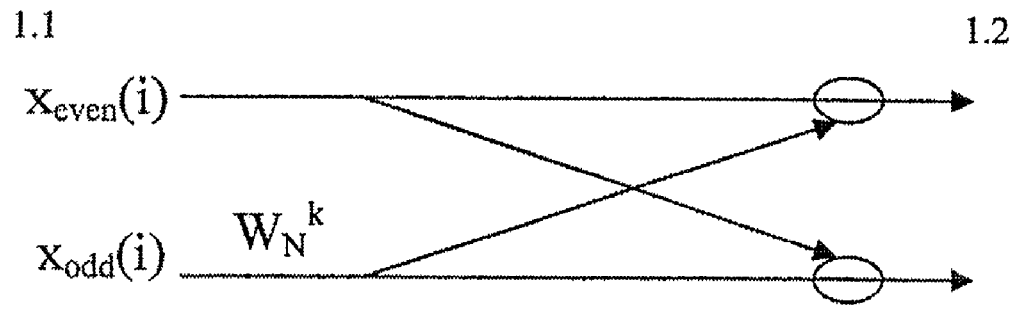
FIG. 1 shows the basic structure of the signal flow in a radix-2 butterfly computation for a discrete Fourier transform.
Figure 2:
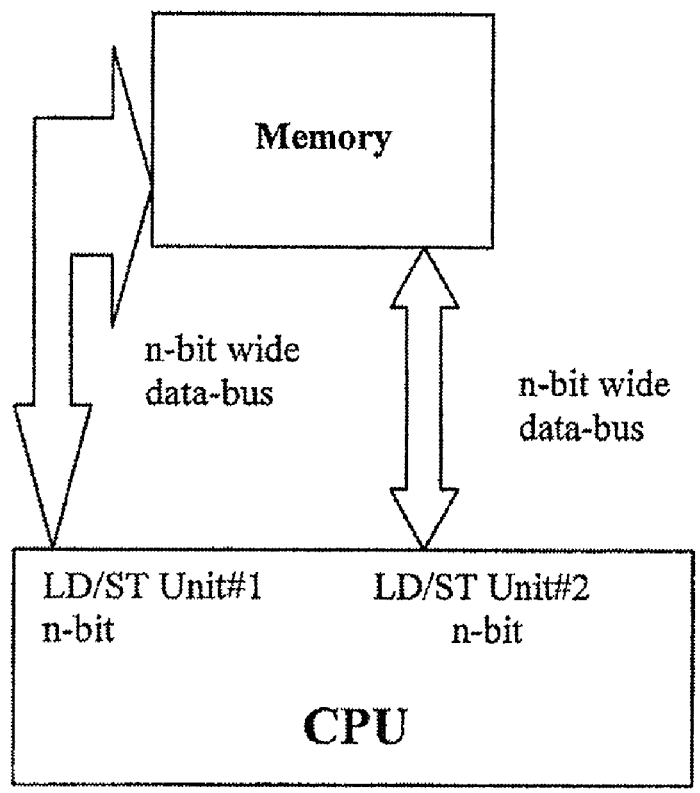
FIG. 2 shows a block diagram for simultaneous loading of two n-bit operands according to prior art.

FIGS. 1 and 2 have already been described in the background to the invention.

Figure 3:
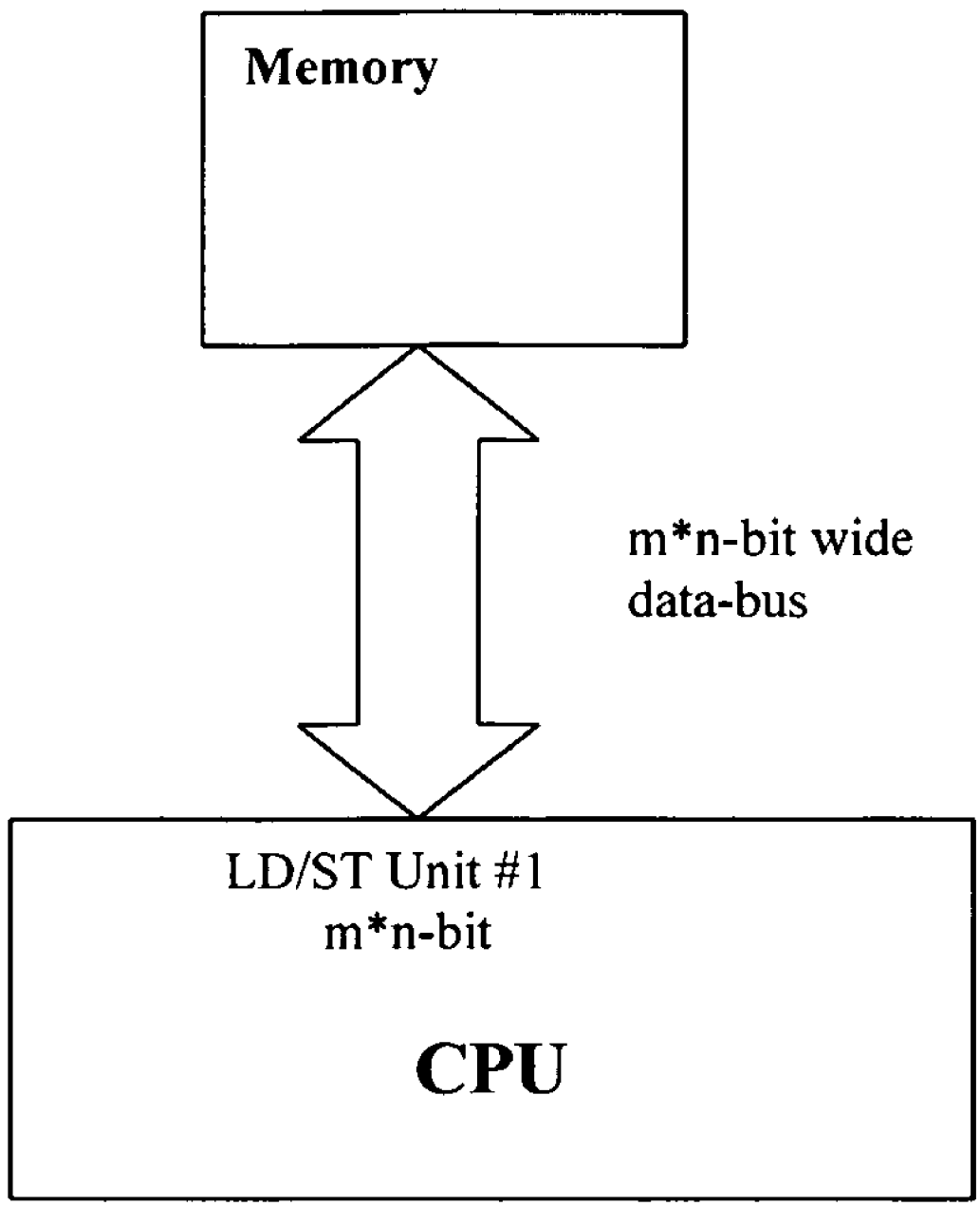
FIG. 3 shows a block diagram for simultaneous loading of 'm' number of n-bit operands in accordance with the present invention.

FIG. 3 shows a block diagram for simultaneous loading of 'm' number of n-bit operands in accordance with the present invention. In this invention an area-efficient, cost effective and speedy solution for the FFT/IFFT computation is provided by providing an FFT/IFFT processor that has an augmented data bus that connects memory and CPU. The memory stores the operands of multiple consecutive butterflies in contiguous storage locations. The CPU has a load store unit connected to the augmented data buses that is capable of simultaneously accessing and processing said multiple butterfly operations thus providing above stated advantages. The operation of the processor is understood and described in the following discussion.

Figure 4:
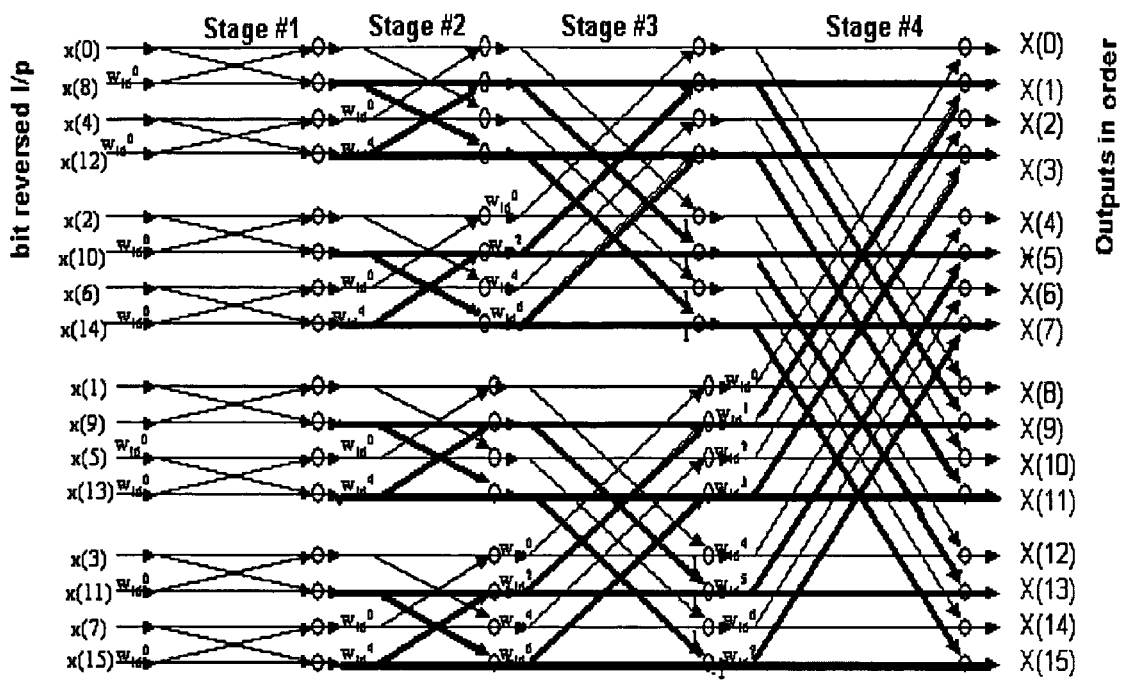
FIG. 4 shows a 2-processor implementation of butterflies for a 16-point FFT, in accordance with the present invention for the multi-processor case.

FIG. 4 shows the implementation for a 16-point FFT using the present invention for a single as well as a two-processor system. Dark lines are in one memory block, and red lines in the other. Each memory block is of size 8-points (N/2 in general terms). '0' represents the computational blocks. The left side of each computational block is its input (the time domain samples) while the right side is its output (transformed samples). The present invention uses a mixed radix approach with decimation in time. The first two stages of the radix-2 FFT/IFFT are computed as a single radix-4 stage (not shown in FIG. 4). As these stages contain only load/stores and add/subtract operations there is no need for multiplication. This leads to reduced time for FFT/IFFT computation as compared to that with full radix-2 implementation. The next stages have been implemented as radix-2. The three main nested loops of conventional implementations have been fused into a single loop which iterates "N/2*($\log_2$ N-2))2*(number of processor)" times. If we see any stage, it is evident that inputs/outputs of consecutive butterflies in any memory block are in consecutive memory locations. So with one load/store instruction inputs/outputs for multiple butterflies are loaded/stored. So a processor is used to compute multiple butterflies in one loop iteration. For a single processor system, one processor accesses the different memory blocks. For a two-processor system, two different processors access the two different memory blocks. This is because there is no data dependency between different butterflies of different memory blocks in this algorithm, both during and between stages.

In one implementation (a two processor system) of the invention each processor comprises of one or more ALUs (Arithmetic Logic unit), multiplier units, data cache, and load/store units. Each processor has an autnomous memory and the distribution of butterflies is such that there is no inter-processor communication required after the distribution of data. The distributions of data into different memory blocks take place after "$\log_2 P$" stages where "P" is the number of processors.

Figure 5:
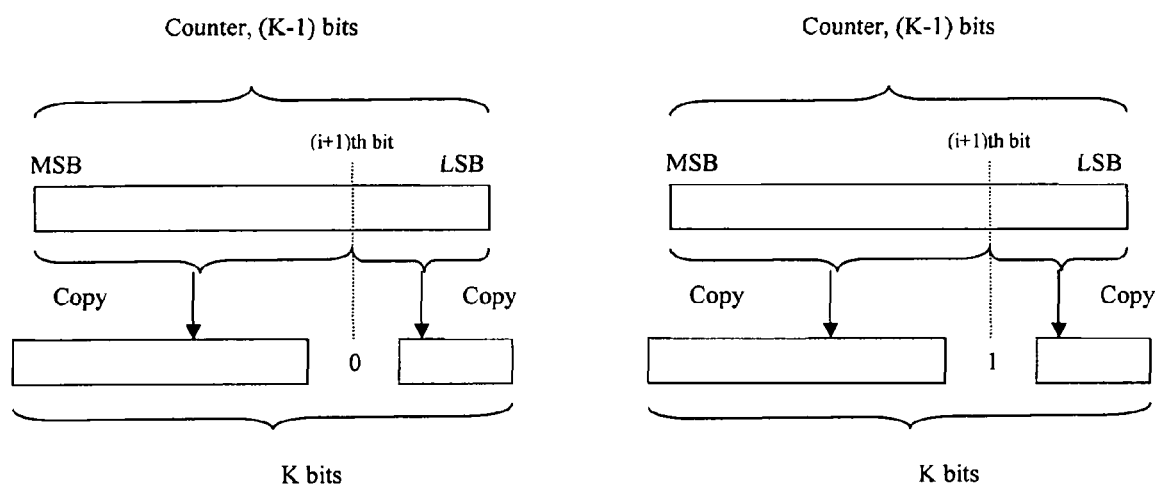
FIG. 5 shows a block diagram for address generator.

According to the invention, the addresses of inputs to the multiple contiguous butterflies in a stage ($i^{th}$ stage) of an FFT/IFFT of size N having number of stages ($\text{Log}_2 N$) K is generated by initiating a counter that counts from '0' to 'N/2−1' and then constructing the input address of the first input of each butterfly by introducing '0' at $(i+1)^{th}$ location from the Least Significant Bit (LSB) of the counter value and the second input addresses are constructed by introducing '1' at $(i+1)^{th}$ location from the Least Significant Bit (LSB) of the counter value as shown in FIG. 5.

Further, for generating addresses of the twiddle factor in a stage 'i', for each processor j(where j=0,1,2, . . . (P−1)) another counter is initiated with values from '0' to 'P−1' wherein 'P' is the total number of the processor in the system, then the address of twiddle factor is constructed by appending {(K−1)−(i+2)} number of zeroes to the additional counter value. For generating twiddle factor address of the next butterfly in same stage 'i' the additional counter value is incremented by number of contiguous butterflies which are to be computed simultaneously and subsequently appending {(K−1)−(i+2)} zeroes to get the new additional counter value.

Inter-processor communication takes place only before and after all the computations have been completed. The amount of data communication overhead does not increase with an increase in the number of processors.

It will be apparent to those with ordinary skill in the art that the foregoing is merely illustrative and not intended to be exhaustive or limiting, having been presented by way of example only and that various modifications can be made within the scope of the above invention.

Accordingly, this invention is not to be considered limited to the specific examples chosen for purposes of disclosure, but rather to cover all changes and modifications, which do not constitute departures from the permissible scope of the present invention. The invention is therefore not limited by the description contained herein or by the drawings, but only by the claims.

What is claimed is:

1. An FFT/IFFT processor comprising:
   computation means capable of processing butterfly operations using a first processor and a second processor, the first processor processing a first butterfly operation using a first operand and a second butterfly operation using a second operand;
   storage means for storing the first and second operands; and
   a mechanism for storing operands of the butterfly operations such that the first and second operands are stored in contiguous storage locations,
   wherein said mechanism is an address generator that generates addresses for an FFT/IFFT stage and the address of the first and/or second operand of the butterfly operations are constructed by introducing zero and/or one at a location in a stage address generated by the said address generator.

2. An FFT/IFFT processor as claimed in claim 1, wherein said location depends upon a stage number of the FFT/IFFT stage which is being computed.

3. An FFT/IFFT processor as claimed in claim 1, wherein twiddle factors of the butterfly operations are computed by initializing a counter and then incrementing it by a value corresponding to the number of butterfly operations which are to be computed simultaneously and appending the result with a specified number of "0"s.

4. A method for FFT/IFFT processing, comprising:
   processing butterfly operations simultaneously by a first processor and a second processor;
   loading first and second operands in parallel;
   storing the first and second operands in contiguous storage locations;
   processing the first butterfly operation by the first processor using the first operand; and
   subsequently to processing the first butterfly operation, processing the second butterfly operation by the first processor using the second operand.

5. A method for FFT/IFFT processing as claimed in claim 4, further comprising:
   generating addresses for an FFT/IFFT stage;
   constructing addresses of first and/or second operand of the butterfly operations by introducing zero and/or one at a predetermined location in an FFT/IFFT stage address;
   initializing a counter and incrementing it by a value corresponding to the number of butterfly operations which are to be computed simultaneously and appending the result with a specified number of "0"s for computing twiddle factors of the butterfly.

6. The method for FFT/IFFT processing of claim 4, wherein the first and second processors do not engage in interprocessor communication after a first stage of butterfly operations until all computations for the FFT/IFFT have been completed.

7. A device for performing an FFT and/or IFFT, the device comprising:
   a processing unit to perform a plurality of butterfly operations at the same time using a plurality of operands, the processing unit comprising a first processor and a second processor, wherein the first processor processes a first butterfly operation using a first operand and a second butterfly operation using a second operand; and
   a storage unit to store the first and second operands in contiguous storage locations.

8. The device of claim 7, wherein the storage unit comprises memory blocks that each store N/2 of the plurality of operands.

9. The device of claim 7, wherein the first and second operands are accessed simultaneously in the storage unit.

10. The device of claim 7, wherein the first and second processors do not engage in interprocessor communication after a first stage of butterfly operations until all computations for the FFT/IFFT have been completed.

* * * * *

UNITED STATES PATENT AND TRADEMARK OFFICE
CERTIFICATE OF CORRECTION

PATENT NO. : 7,774,397 B2
APPLICATION NO. : 11/003924
DATED : August 10, 2010
INVENTOR(S) : Kaushik Saha et al.

It is certified that error appears in the above-identified patent and that said Letters Patent is hereby corrected as shown below:

On the title page, item 73 should read:
[73] Assignees: STMicroelectronics Pvt. Ltd., Uttar Pradesh, India Signed and Sealed this Ninth Day of November, 2010

David J. Kappos
*Director of the United States Patent and Trademark Office*